O. F. BENTON.
FISH POND.
APPLICATION FILED MAY 18, 1921.
1,393,339.
Patented Oct. 11, 1921.
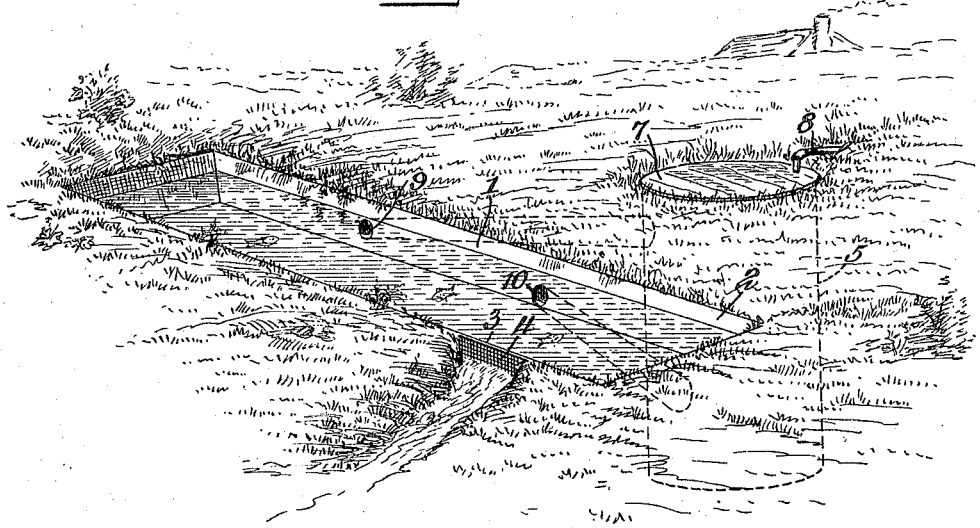
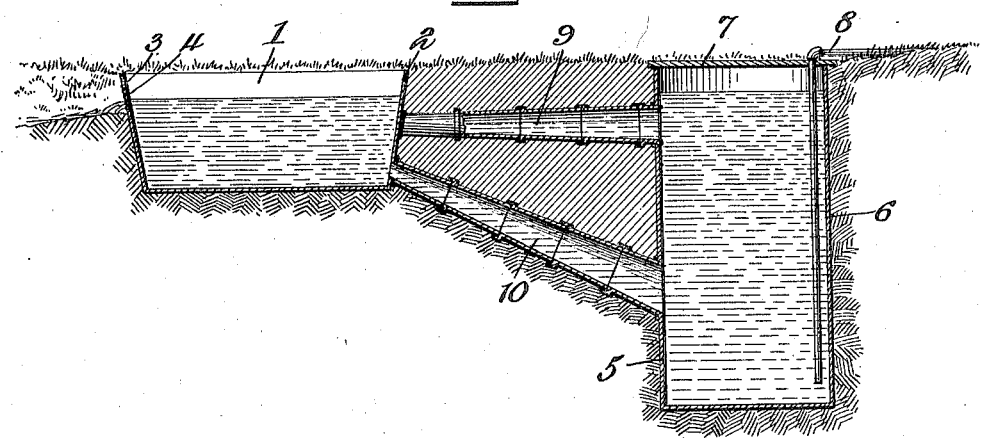
Orlando F. Benton
INVENTOR
WITNESSES
BY
ATTORNEY

UNITED STATES PATENT OFFICE.

ORLANDO F. BENTON, OF MENDON, OHIO.

FISH-POND.

1,393,339.   Specification of Letters Patent.   Patented Oct. 11, 1921.

Application filed May 18, 1921. Serial No. 470,687.

*To all whom it may concern:*

Be it known that I, ORLANDO F. BENTON, a citizen of the United States, residing at Mendon, in the county of Mercer and State of Ohio, have invented a new and useful Fish-Pond, of which the following is a specification.

This invention has reference to fish ponds, and its object is to provide a construction wherein fish may be profitably raised and at the same time present no element of danger to children, whereby the pond may be utilized as a place of amusement for children.

In accordance with the invention, there is provided a suitably lined excavation of small depth and of ample size with a deeper excavation also suitably lined and of considerably greater depth with the deeper excavation connected at high and low points with the shallow and larger excavation, whereby the fish are provided with a deep water retreat also valuable for receiving any accumulation, so that the structure may be readily cleansed from time to time.

The invention will be best understood from a consideration of the following detailed description taken in connection with the accompanying drawing forming part of this specification, with the understanding, however, that the invention is not confined to any strict conformity with the showing of the drawing, but may be changed and modified so long as such changes and modifications mark no material departure from the salient features of the invention as expressed in the appended claims.

In the drawing:

Figure 1 is a perspective view of a fish pond constructed in accordance with the invention.

Fig. 2 is a vertical section through the fish pond structure.

Referring to the drawings, there is shown a fish pond 1 of any suitable or convenient size, say of rectangular or similar shape about 25 feet by 150 feet in area and about 3 feet in total depth, thereby allowing for rising and falling of the level of the water. In order to prevent leakage or seepage, the pond may be furnished with a lining 2, of cement or other material, or where clay soil is available no lining is necessary. There is also provided an overflow 3 from which surplus water may escape. The overflow 3 is provided with a grating or netting 4 to allow for the overflow and to prevent fish from escaping.

At some distance from the pond, another excavation 5 is provided. This excavation is considerably deeper than the pond and may reach from seven to nine feet in depth or more. This excavation 5 is provided with a lining 6 to retain water therein and also with a cover 7 to avoid danger of anything or anybody falling into the excavation 5. Water is furnished to the excavation or reservoir 5 by means of a pipe 8 communicating with any suitable source of water supply, such, for instance, as a well having a pump connected to a windmill, for such an arrangement will provide an ample source of water to maintain the pond and reservoir full of water to the desired level, and will allow for overflow to keep the water fresh.

Connecting the upper portion of the pond with the upper portion of the reservoir is a duct 9 and connecting the lower portion of the pond with the lower portion of the reservoir is another duct 10, both expanding in diameter from the pond toward the reservoir. The ducts 9 and 10 connect to the pond near opposite ends of the latter and, therefore, are at an angle to each other as well as approaching each other from one end toward the other with respect to a vertical plane. This facilitates the leading of dirt or other accumulations toward a common point where the dirt may be readily taken from the reservoir. Both ducts are preferably made of drain tile.

The pond such as described is adapted to support fish, especially if water plants be located therein, and if the pond be made large enough, fish may be raised for sale therein, as well as furnishing amusement for children and other persons. The reservoir 5 furnishes a cool, dark retreat into which the fish may find ready entrance and both the reservoir and the expanding pipes leading from the pond to the reservoir provide an abundance of underground room for the fish.

A pond of about the depth given is deep enough so as not to freeze to the bottom in the wintertime and at the same time is not dangerous to small children. The lining of both the pond and the reservoir may be of brick or cement or other material suitable for the purpose. Moreover, the pond, beside furnishing amusement for people, may be utilized for irrigation purposes, especially if located on sufficiently high ground.

The object of having the pipe or duct smaller at the pond end is to reduce the liability of dirt getting into it and it also renders it easier to set a net there. Fish that are not wanted are prevented by the net from being injured. The upper duct 9 is to let the fish back when they crowd to the top of the reservoir 5, as sometimes occurs.

I claim:—

1. An extended fish pond of shallow depth, and a reservoir of greater depth, with underground ducts connecting the pond at spaced points with the reservoir at different heights, and means for supplying the reservoir with water.

2. An extended fish pond of shallow depth, and a reservoir of greater depth, with underground ducts connecting the pond at spaced points with the reservoir at different heights, and means for supplying the reservoir with water, the ducts increasing in size from the pond to the reservoir.

3. An extended fish pond of shallow depth having an overflow on one side, a reservoir of greater depth and less area than the pond, underground ducts between the pond and reservoir expanding in diameter from the pond to the reservoir with one of the ducts slanting to a greater depth than the bottom of the pond, means for introducing water into the reservoir, and means for the overflow of the water from the pond.

4. An extended fish pond of shallow depth with a lining for preventing seepage of water therefrom, said fish pond having an overflow to control the level of water in the pond, a covered reservoir at a distance from the pond and also having a lining to prevent seepage, the reservoir being sunken into the ground a greater depth than the bottom of the pond, tapering ducts connecting the pond and reservoir, with one duct approximately horizontal and higher than the other duct, and the second duct slanting downwardly to a greater depth than the first-named duct, and means for supplying the reservoir with water.

In testimony that I claim the foregoing as my own, I have hereto affixed by signature.

ORLANDO F. BENTON.